(12) United States Patent
Collins et al.

(10) Patent No.: US 10,104,096 B1
(45) Date of Patent: *Oct. 16, 2018

(54) HOST-BASED, NETWORK ENABLED, INTEGRATED REMOTE INTERROGATION SYSTEM

(71) Applicant: The United States of America as represented by the Secretary of the Air Force, Washington, DC (US)

(72) Inventors: James C Collins, Mico, TX (US); Chet M Wall, San Antonio, TX (US); Robert J Kaufman, III, San Antonio, TX (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/612,343

(22) Filed: Jun. 2, 2017

Related U.S. Application Data

(63) Continuation of application No. 14/788,835, filed on Jul. 1, 2015, now Pat. No. 9,860,258.

(51) Int. Cl.
H04L 29/06 (2006.01)

(52) U.S. Cl.
CPC ...... *H04L 63/1408* (2013.01); *H04L 63/0209* (2013.01); *H04L 63/08* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 7,439,763 B1* | 10/2008 | Kavipurapu | H03K 19/177 326/38 |
| 2004/0254779 A1* | 12/2004 | Wang | G06F 11/261 703/27 |
| 2008/0307488 A1* | 12/2008 | Hammond, II | H04L 41/046 726/1 |
| 2011/0154473 A1* | 6/2011 | Anderson | G06F 21/64 726/11 |
| 2015/0341383 A1* | 11/2015 | Reddy | H04L 63/0245 726/22 |

* cited by examiner

*Primary Examiner* — Eleni A Shiferaw
*Assistant Examiner* — Andrew J Steinle
(74) *Attorney, Agent, or Firm* — AFMCLO/JAZ; Jason Sopko

(57) ABSTRACT

An Enhanced Ethernet Network Interface Card (EENIC) interfaces with a host and a network. The EENIC includes an internal network interface controller (NIC), a field programmable array (FPGA) in electrical communication with the internal network interface controller, and a peripheral component interconnect express (PCIe) controller, in independent electrical communication with the field programmable array or the internal network interface controller. The FPGA is configured to intercept data from either the host, or from the network, or from a combination thereof. Additionally, the configured interception is undetected by the host, or by the network, or a combination thereof.

17 Claims, 5 Drawing Sheets

HOST-BASED, NETWORK ENABLED, INTEGRATED REMOTE INTERROGATION SYSTEM

RIGHTS OF THE GOVERNMENT

The invention described herein may be manufactured and used by or for the Government of the United States for all governmental purposes without the payment of any royalty.

Pursuant to 37 C.F.R. § 1.78(a)(4), this application claims the benefit of and priority to prior filed co-pending Provisional application Ser. No. 14/788,835, filed Jul. 1, 2015, which is expressly incorporated herein by reference.

FIELD OF THE INVENTION

The present invention relates generally to computer network security, and more specifically to network interface cards and related security hardware.

BACKGROUND

Most present day DoD computers are monitored and protected by host-based security software such as malware detectors, virus signature detection engines, and signature or protocol based intrusion detection software. Because of the sophistication of today's exploitation code, these host-based security defenses can be easily modified or disabled, leading to generalized system vulnerabilities. Moreover, advanced exploitation code has been known to thwart or bypass some of the most advanced detection modules and gain a persistent foothold within the computer system's underlying hardware/firmware structure. This may result in pervasive and persistent presence on the affected node(s).

These system vulnerabilities are a result of the inherent design of the underlying operating systems design and its associated memory utilization structure. In a most fundamental explanation, the operating system manages the allocation and utilization of the computer system's memory space. Specialized areas within these allowable memory ranges are assigned by the operating system to perform various system level functions. These memory areas or ranges are most generally categorized as either protected or unprotected. The most trusted operating system processes, to include the aforementioned security protection tools, are for the most part, assigned and run within the protected memory space. User applications and data processes are mostly run in the unprotected memory domain. Exploitation code is crafted to exploit the operating system protection domains which can result in a vulnerable or exploited system.

If we now consider the network security environment in a large-scale enterprise, we can identify several key system level design flaws that leave the aggregated system with vulnerabilities and open to advanced persistent threats. The common means of securing both local and enterprise networks is centered on the concept of "defense in depth". In this structure, network security components are designed and positioned on a network at various hierarchical points of observation and control. For example, the network point of presence (PoP), or point where the telecommunications carrier lines enter a facility is typically the point where a majority of network command, control, and monitoring takes place. In an effort to control the points of entry into the enterprise, a series of incremental PoP consolidation actions were taken over the last decade. The current notional architecture can be best described as being a set number of regional network operation centers in which each of these regional centers provide basic network services to a number of underlying service units or joint bases across the enterprise.

At these network enterprise level entry points, a series of appliances (software and hardware) are arranged and configured to perform a multitude of security application functions. Some of the more common systems employ perform services such as intrusion detection and prevention, network level firewalling, data analytics, routing and switching, system level enterprise management and control. More detailed functions some of the applications may include may be packet filtering and routing, signature monitoring, detection and reporting, proxy port services with redirects, and application, port, and protocol routing and filtering, email filtering, scanning, and containment, HTML (web browser) flow monitoring, and public key infrastructure services.

These security appliances and capabilities listed are not an exhaustive list but are a majority representation of the protection and control systems commonly in use across major enterprise networks. In general each of the outlying service units and satellite installation have retained a certain level of network service capabilities (routing, switching, proxy services and firewalling) however as a standard of practice, a majority of the network services are established at the distributed regional centers. This system level approach of PoP consolidation and with distributed defense-in-depth network security structure has significantly reduced (albeit not completely stopped) the external exploitation vectors which previously existed, however, other exploitation vectors within the enterprise have emerged.

The primary and distinct disadvantage of this latest network security architecture construct is the inability of these upper hierarchical level security systems to monitor, collect, analyze, and control lower level enclave security relevant activities. The task of security monitoring capabilities at these lower enclave levels has been levied on the end systems or host computers which reside on the network. These systems, as previously described, are subject to system level exploitation by a multitude of attack methodologies such as advanced malware, spyware, and botnets. The exploits are able to persist or propagate within and across these lower level enclaves, often bypassing the upper level security appliances.

Therefore, there exists a need in the art for a host-implemented security apparatus operating independently from the operating system and memory space of the host machine.

SUMMARY OF THE INVENTION

The present invention overcomes the foregoing problems and other shortcomings, drawbacks, and challenges of enhancing network security. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention an Enhanced Ethernet Network Interface Card (EENIC) for interfacing with a host and a network is provided. The EENIC includes an internal network interface controller (NIC), a field programmable array (FPGA) in electrical communication with the internal network interface controller, and a peripheral component interconnect express (PCIe) controller, in independent electrical communication with the field programmable array or the internal network interface controller. The FPGA is configured to intercept data from either the host, or from the network, or from a combination thereof. Additionally, the configured interception is undetected by the host, or by the network, or a combination thereof.

According to another embodiment of the disclosed invention, a method for performing security actions with an Enhanced Ethernet Network Interface Card (EENIC) is provided. The method includes providing an EENIC including a Field Programmable Array, an internal Network Interface Controller (NIC) in electrical communication with the FPGA, and a peripheral component interconnect express (PCIe) controller in electrical communication with the FPGA or the internal network interface controller. The method further includes intercepting data from either a host or a network. The method also includes performing an action on the data.

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
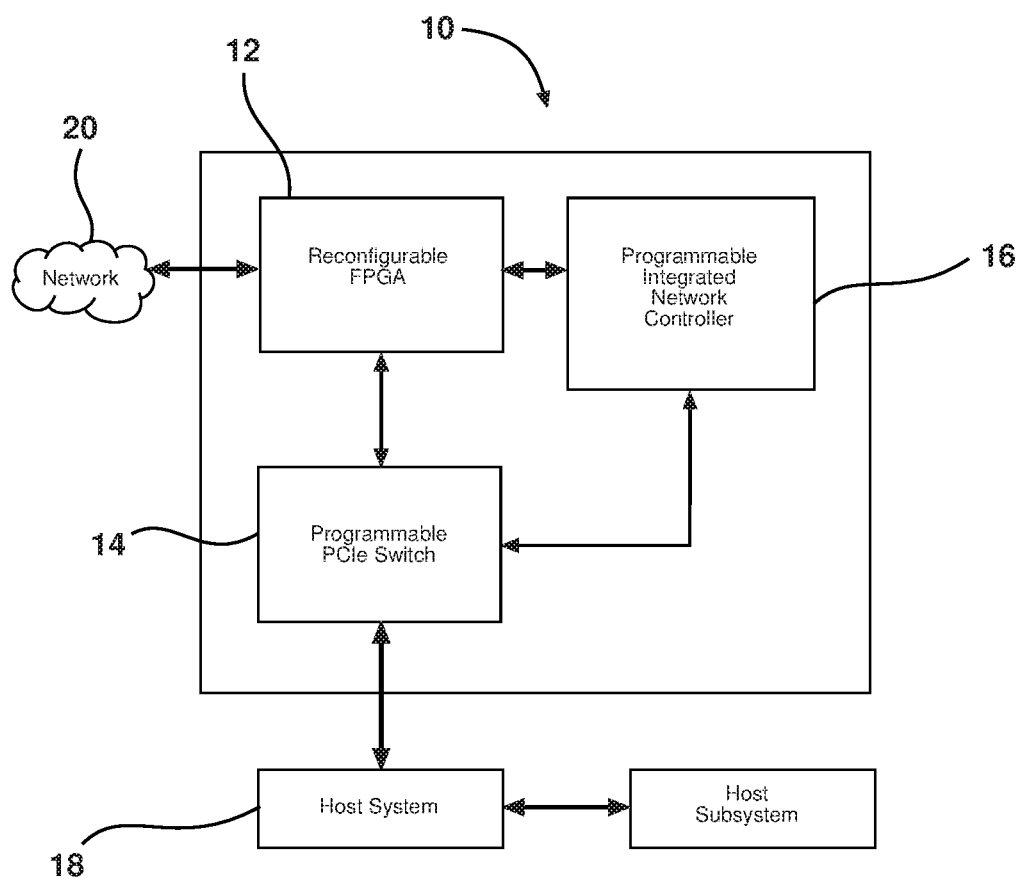
FIG. 1 is block diagram illustrating three components interacting with a host system and network according to embodiments of the disclosed invention.

Turning attention to FIG. 1, according to embodiments as disclosed herein, a hardware portion of the invention may be referred to as an Enhanced Ethernet Network Interface Card (EENIC) 10. The principle operation of the EENIC may be centered on three integrated circuit components; a field programmable gate array (FPGA) 12, a peripheral component interconnect express (PCIe) integrated circuit 14, and an integrated network interface controller (NIC) 16. As will be explained in detail below, it is the combination, configuration, interoperability, and reconfigurable features of these three interacting components 12, 14 and 16 that yield unique security capabilities that comprise the major functions of the EENIC 10.

Arrows in FIG. 1. Represent the interaction paths between these three principle components 12, 14, and 16 within the EENIC 10 and the external interfaces, namely the host system 18 and the network 20. Other components (not shown) on the EENIC 10 system may be secondary supporting function devices that include memory, buffers, network physical interfaces, power supplies and distribution, data interconnects, and the like. Data communications to and from the network 20 and host 18 can take multiple data flow paths and have multiple endpoints within this system central to these three major EENIC 10 components 12, 14, and 16.

The EENIC 10 may have multiple modes of operation when connected within a given computer system or network 20 enclave environment. The EENIC 10 interfaces into the host system 18 in one or more selectable ways to include (1) a promiscuous power (PP) mode, (2) a promiscuous network (PN) mode, (3) a promiscuous host (PH) mode, and (4) an active host embedded (AHE) mode. The EENIC 10 mode of operation is dependent on the how the FPGA 12 is programmed in conjunction with the network interface controller 16 and integrated PCIe switch 14. The reconfigurable capability of the EENIC 10 is achieved by reprogramming the firmware of the FPGA 12 and reconfiguring the PCIe 14 and integrated NIC 16. The EENIC 10 system may be reprogrammed, either remotely or locally, to any of the aforementioned modes. It should be noted that these modes are merely exemplary and additional modes may be configured to meet alternative design objectives.

Figure 2:
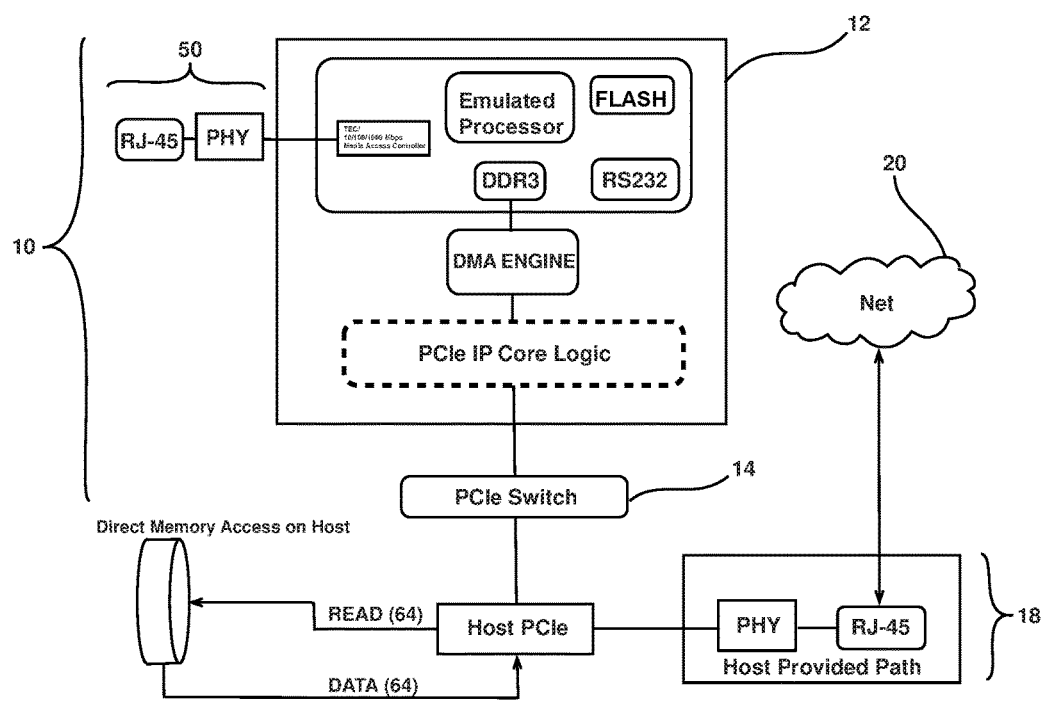
FIG. 2 illustrates an embodiment of the disclosed invention configured in a promiscuous host mode of operation.

FIG. 2 illustrates one embodiment the EENIC 10 while configured to operate in a promiscuous host mode. In this configuration, the EENIC 10 is configured as a PCIe endpoint device, interfacing directly with the host computer 18 via the PCIe bus. The intercommunications between the EENIC 10 and the host computer 18 is provided electrically via the PCIe signaling protocols and the logical communications between the host operating system 10 is via a PCIe device driver which is loaded onto the host computer. This device driver is what allows the onboard EENIC 10 PCIe Switch 14 to connect to the host 18 PCIe root complex. Since the EENIC 10 becomes a connected component off the root complex, it is able to access host level resources non-cooperatively from the host system. Specifically, it does not require arbitration with the host CPU in order to access shared PCIe bus resources which include memory space in both RAM and disk storage devices. In essence, a software emulated processor may run on the FPGA 12 (by way of example, and not limitation, the MicroBlaze® emulated processor by Xilinx corporation) and can issue read and write commands directly to these host level resources, unbeknownst to the host system 18. In the alternative, a design specific hardware based processor may be employed. A network connected system, via the EENIC 10 Ethernet device 50 will enable a remote system to access internal host resources, promiscuously monitoring the system.

Figure 3:
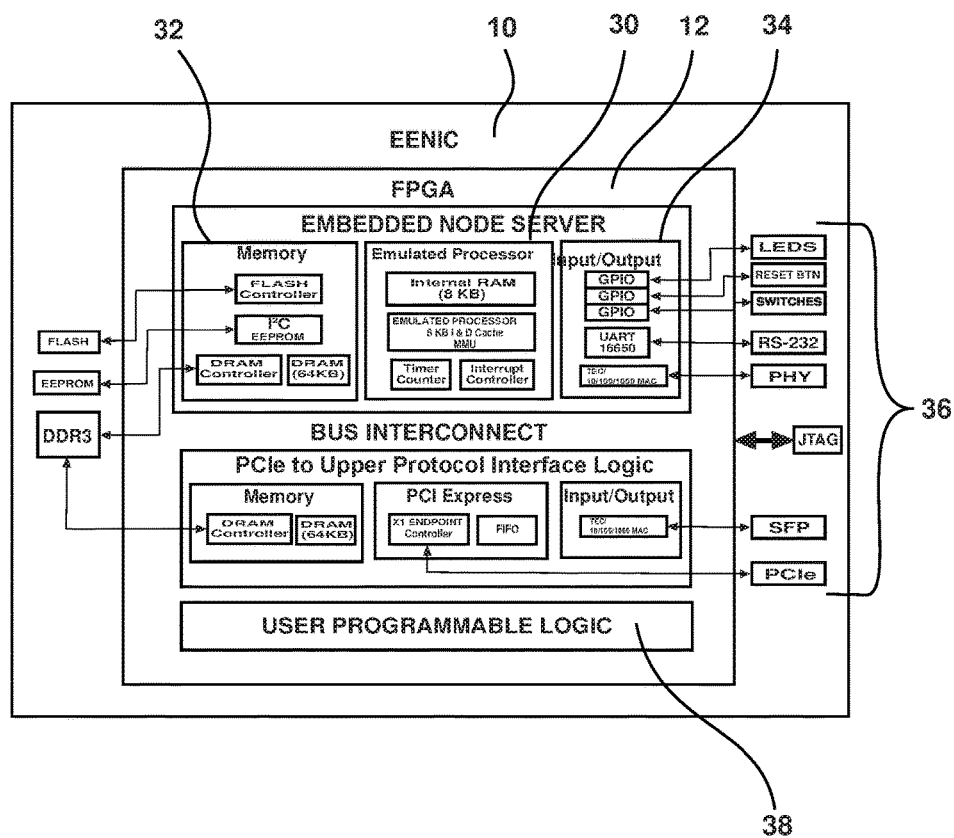
FIG. 3 illustrates a structural representation of programming and configuring an FPGA in accordance with embodiments of the disclosed invention.

FIG. 3 illustrates a structured representation of programming the EENIC 10 FPGA component 12 to model a system on a chip configuration. This figure shows a high level structure including an emulated processor 30, memory 32, input and output interfaces 34, bus level interface logic blocks 36 (e.g. PCIe, Ethernet), as well as extended user programmable logic fabric space 38.

Because of the modifiable nature of the EENIC 10, both simple and complex algorithms can be installed onto the system based on individualized security protection needs of the platform. This integrated system is network enabled and, as such, provides a means to extend the security applications of this embedded system beyond the boundaries of the targeted host 18 platform.

Figure 4:
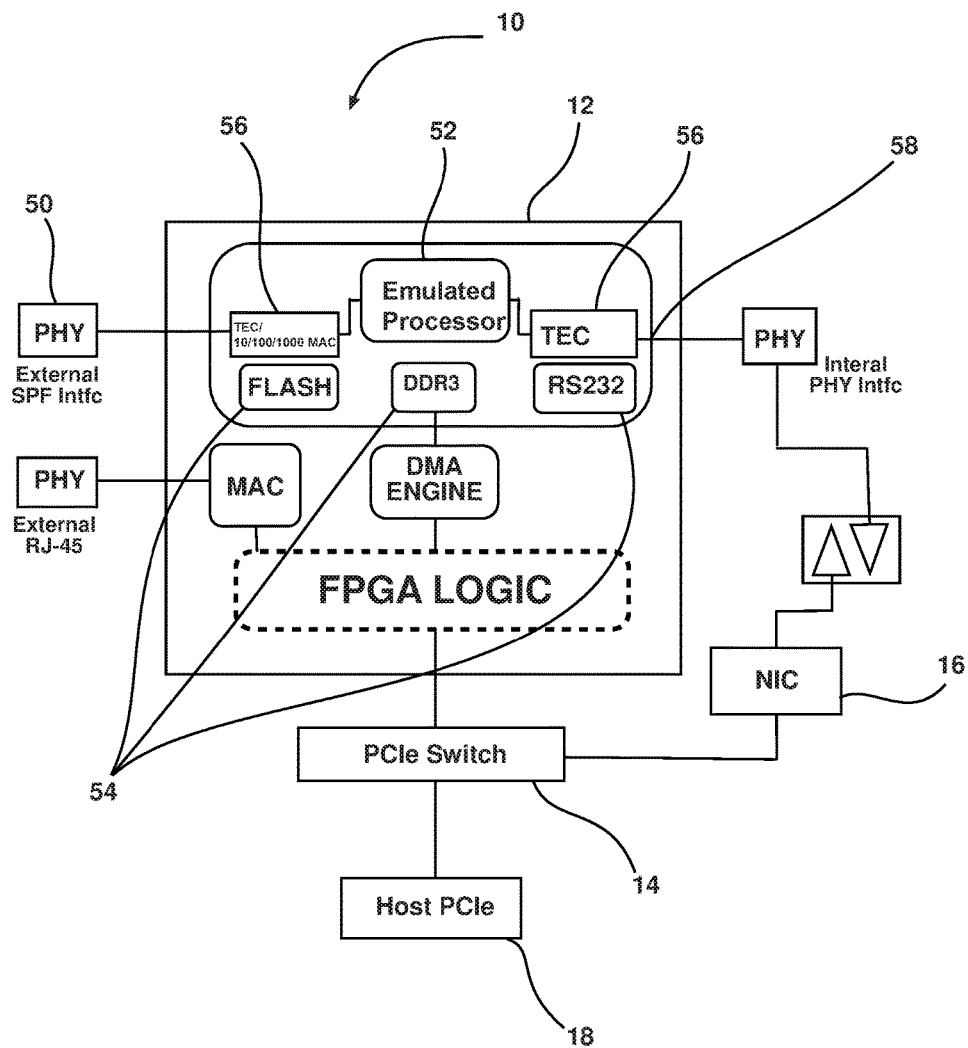
FIG. 4 depicts and embodiment of the disclosed invention configured to operate in an Active Host Embedded mode.

One such illustrative mode of operation, enabled by the configuration of FIG. 4, is the AHE mode. In the AHE mode, the EENIC 10 is configured and embedded within the targeted host 18 system to act as the primary network interface for the host 18. All network data that flows into and out of the host 18 computer must pass through, and are controlled by, the EENIC 10 system. The primary interface for the host 18 then becomes the physical connection 50. Data communications passes through this interface into the programmable emulated microprocessor 52 which is digital logic, constructed on the FPGA fabric. This emulated microprocessor 52 may be generated on the FPGA 12 fabric using licensed intellectual property available from, by way of example, the Xilinx Corporation (one potential manufacturer of FPGA 12 device). The emulated microprocessor 52 is interconnected to external physical EENIC board devices 54 (to include flash, RS232, DDR3 memory) in order to construct a complete computing system. In addition to these physical system interfaces, two software interfaces are also programmed into the FPGA 12 fabric as two tri-mode Ethernet medium access control (TEC) interfaces 54. Tri-mode refers to the ability of these interfaces to selectively operate at 10, 100, or 1000 Mbps. The TEC 56 modules may be predefined software interfaces, and may be provided by the FPGA manufacturer (such as the Tri Mode Ethernet Media Access Controller (TEMAC) provided by the Xilinx Corporation). On this internal FPGA 12 based computing system, a complete and independent operating system (e.g. Linux) may be installed. The operating system may be configured to handle two TEC 56 interfaces. The configuration of this operating system, in conjunction with the interconnected devices 54 and two software instantiated TEC 56 modules, comprises a data flow inspection and control environment 58 for data passing into and out of the FPGA 12.

Once the data passes through the previously described subsystem, it is communicated from the TEC 56 interface through the physical electronic interfaces and into the network interface controller (NIC) 16. This interface is the first actual externally acknowledged interface. More specifically, the aforementioned microprocessor 52 subsystem is completely transparent and non-addressable as a conventional access point for external communications. As will be described in greater detail below, as part of the EENIC 10 configuration, a specialized access protocol has been developed that does allow direct, secure (encrypted) communications to this microprocessor 52 subsystem while ignoring conventional (unauthorized) connection attempts. Continuing with the data flow from the NIC 16 to the PCIe switch 14, data is routed from this PCIe 14 endpoint directly to the internal host 18 bus interface.

It should be noted that, for the AHE mode of operation, the standard user-based data flow is via elements, 50, 52, 58, 16, 14, and 18 as well as the reverse directional data flow. In this data flow configuration, the PCIe switch 14 acts as an endpoint device on the computer bus and is responsible for the presentation and reporting of devices directly connected its own interfaces and the computer bus. In this capacity, and in the AHE configuration mode, the PCIe switch 14 is programmed to report the existence of the NIC 16 device. This essentially obfuscates the existence of the FPGA 12 on the system From a host 18 user perspective, the EENIC 10 is both logically and physically transparent; both non-detectable and non-accessible.

As stated, in the AHE mode, the host 18 systems on-board Ethernet interface is disabled, forcing the transparent EENIC 10 interface to become the only network 20 access point. With all data flowing thru the microprocessor 52 subsystem, a number of effects can be employed by programmed instructions to the operating system on data as it is transported within the EENIC 10. The EENIC 10 may perform actions on the data, such as filtering (both inbound and outbound), blocking the data, forwarding the data, and scanning the data for malware. These actions can be used to protect the host 18 or the network 20 from activities such as virus propagation, botnet operations, or other undesirable communications, and may be performed in near real time (without any perceptible delay by the user of the host 18. It should be noted that the data actions employed by the EENIC 10 are completely outside of the control or influence of the host 18 operating system. As a result, any potential malware that may exist on the host 18 system (which can often interfere with security operations or protections) is not able to impact the operations of the EENIC 10, which is acting fully independently of the host 18 system it is embedded within.

Recall that in the AHE mode, the internal microprocessor 52 subsystem is transparent to the user and is inaccessible to normal remote access connection attempts. Essentially the EENIC 10 platform and its subsystems are in what is known as promiscuous network mode during AHE operation. One of the unique features of the EENIC 10 platform as configured in the AHE mode is the functionality of a specialized access protocol to allow direct, secure (encrypted) communications to the microprocessor 52 subsystem. This access is established without any intervention, interaction, or even awareness by the host 18 system that the EENIC 10 is embedded within. This access methodology may be referred to as a network wormhole connection. The ability to establish a remote wormhole connection to the EENIC 10 platform is the method by which remote command and control of the IRIS platform is established and is also the means by which data acquisition from the IRIS platform is performed. Normal user data communications continues uninterrupted by the processes surrounding the establishment, operation, and tear down of a secure network wormhole connection.

The concepts and mechanisms behind this network wormhole communications protocol are performed via a unique initiation sequence and in a novel internal address binding process. This internal address binding process allows the EENIC 10 network interfaces 16 to communicate, and subsequently monitor the network 20 data flows using the same interface address as the original host 18 address. This configuration is unique in that the added EENIC 10 interface exists and is uniquely addressable remotely using the specialized communications protocol. Conversely, the addition of this new network 20 capability is not detected on the external facing network and would not be detected by external network monitoring devices on the network 20. In essence, the network interface 16 supporting the internal MicroBlaze processor is undetected vice specialized communication protocols embodied as the network wormhole communications system.

In some embodiments of the disclosed invention, establishing a wormhole connection includes the steps of, starting an initialization state, an establishing state, a binding state, followed by a final established state. While in a running state, both the EENIC 10 programmable microprocessor 52 and a remote client system may be running a tailored version of SSH software. The connection sequence begins when the EENIC receives a specialized datagram or "magic" packet from a requesting client. This magic packet may be referred to as an activation packet, in that the EENIC 10 waits silently until receipt thereof. In some embodiments, this magic packet is a specially crafted address resolution protocol (ARP) in which the sending and receiving address block have been transposed. Other embodiments may use network time protocols, or other broadcast means known to one of ordinary skill in the art. The EENIC 10 (or client acting as the server) is programmed to watch for and respond to this specialized packet responses by establishing an external communications channel on its internal local loop back network address (127.0.0.1). This is a special reserved address and is not addressable from an external source, as it is a registered non-routable network protocol address. The tailored version of the SSH program that is run on the two end systems is designed to establish the end-to-end network connection to the internal local host addresses. The actual protocol address that is seen by the network is in fact the external host addresses advertised by the host operating system and not the address of the EENIC 10 system.

To summarize, the active host embedded (AHE) mode of operation for the EENIC 10 is used to instantiate a basic Integrated Remote Interrogation System (IRIS) configuration onto the FPGA resulting in a security enhancing platform. This security platform, while integrated into the host as an embedded system, remains separate and distinct from the host system in terms of accessibility to the user or system memory space. This EENIC 10 platform provides network 20 connectivity to the host 18 system inheriting full monitoring, controlling, redirecting, and modification capabilities of the network 20 data flows. This system operates in a fully promiscuous mode from both the host 18 side (PCIe) and network 20 (Ethernet) facing interfaces. A tailored Linux operating system may run on the embedded programmable microprocessor 52 which can be further tailored to provide additional security based applications such as a host based firewall, a host based intrusion detection system, packet intercept with redirects, or even man-in-the-middle type applications. A specialized network communications protocol enables a network wormhole function which provides a means for secure remote command and control operations of the EENIC 10 platform with no host 18 system intervention.

Figure 5:
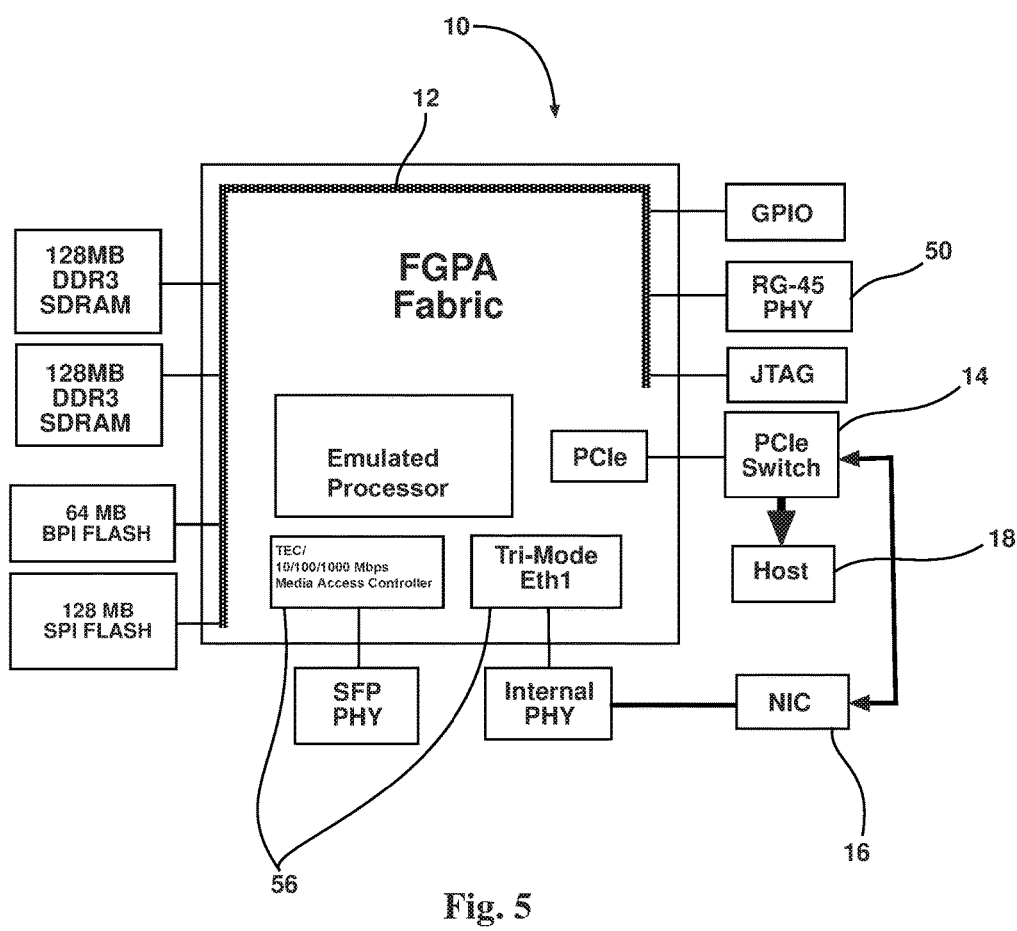
FIG. 5 is a block diagram of an Enhanced Ethernet Network Interface Card in accordance with embodiments of the disclosed invention.

FIG. 5 shows a system block diagram of an embodiment of the EENIC 10 platform. One advantage of the EENIC 10 design over other the prior art, is separation and logical isolation of the FPGA 12 device from the embedded host 18 and the physical and logical isolation of the FPGA 12 from the external network 20. The EENIC design in FIG. 5 clearly shows the physical isolation and separation of the FPGA 12 from the host 18 and network 20 as established by the PCIe switch 14 and the network physical interface 50 and network interface controller 16. The addition of the internal network physical interface device 50 adds the additional capability to logically isolate the FPGA 12 configuration from both external and internal connections. As a result, the FPGA 12, configured in a physical and electrically separated state, is protected from both internal and external access attempts resulting in an improved overall system security.

The FPGA 12, situated within the EENIC 10 in this manner, is also what enables the system to be configured in the various modes of operation as previously defined. These four modes will be summarized serially herein.

The active host embedded mode (AHE), described above and illustrated in FIG. 4, details the system configuration for this embodiment. In the AHE mode, the EENIC 10 is active in-line with full control of all external network 20 data communications to and from the host 18. The EENIC 10 can be accessed via a wormhole connection. The host 18 system's on-board network interface is disabled. The local network 20 connection is direct to the EENIC 10 external interface.

The Promiscuous Host mode (PH) was shown previously in FIG. 2, and the EENIC 10 is embedded within the host 18 and connects as a PCIe endpoint device. The EENIC 10 can be accessed via a wormhole connection. Local or remote controlled processes can non-cooperatively access the host 18 system and subsystem. This mode requires a second Ethernet connection from the network 20 to EENIC 10 system and subsystem.

The two remaining modes, Promiscuous Power (PP) and Promiscuous Network (PN), are system variations of the AHE and PH. In the Promiscuous Power mode, the EENIC 10 is embedded within host 18 but only uses the host 18 as a source for power. No communication is established between host 18 and EENIC 10. The EENIC 10 can be accessed via a wormhole connection. This mode requires a second Ethernet connection from the network 20 to the EENIC 10.

In the Promiscuous Network (PN), the EENIC 10 is embedded within the host 18 and connects as a PCIe endpoint device. The EENIC 10 does not inspect host 18 level network 20 data but acts as the network 20 connection interface for the host 18 system. The EENIC 10 can be accessed via a wormhole connection. In this mode, the EENIC 10 predominately monitors the local network 20 traffic.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An Enhanced Ethernet Network Interface Card (EENIC) for surreptitiously interfacing with a host and a network, the EENIC comprising:
   an internal network interface controller (Nie);
   a field programmable array (FPGA), disposed on the EENIC and configured to operate internal to the host, in electrical communication with the internal network interface controller and to a peripheral component interconnect express (PCIe) controller;
   wherein the PCIe controller is in independent electrical communication with the field programmable array or the internal network interface controller; and
   wherein the FPGA is configured to intercept data from either the host, or from the network, or from a combination thereof, and wherein the configured interception is undetected by the host, or by the network, or a combination thereof.

2. The EENIC of claim 1, wherein the FPGA is configured to intercept data from the host by non-cooperatively extracting the data from a memory space of the host.

3. The EENIC of claim 1, wherein the FPGA is further configured to perform an action on the intercepted data.

4. The EENIC of claim 3, wherein the action comprises blocking the data.

5. The EENIC of claim 3, wherein the action comprises forwarding the data to another location on the network.

6. The EENIC of claim 3, wherein the action comprises scanning the data for malware.

7. The EENIC of claim 3, wherein the action comprises modifying the data structure values of the intercepted data in near real-time.

8. The EENIC of claim 1, wherein the internal network interface controller includes a media access control (MAC) address configured to be replicated from the MAC of the host.

9. The EENIC of claim 8, wherein a protocol level address of the internal network interface controller is configured to be replicated and shared by the protocol level address of the host.

10. A method for performing security actions with an Enhanced Ethernet Network Interface Card (EENIC), the method comprising:
providing an EENIC including a Field Programmable Array that are located internally within a host, an internal Network Interface Controller (NIC) in electrical communication with the FPGA and a peripheral component interconnect express (PCIe) controller, wherein the PCIe controller is in electrical communication with the FPGA or the internal network interface controller;
intercepting data from either the host or network; and performing an action on the data.

11. The method of claim 10, wherein the action comprises blocking the data.

12. The method of claim 10, wherein the action comprises forwarding the data to another location on the network.

13. The method of claim 10, wherein the action comprises scanning the data for malware.

14. The method of claim 10, wherein the FPGA is configured to intercept data from the host by non-cooperatively extracting the data from a memory space of the host.

15. The method of claim 10 further including the step of configuring the FPGA as an emulated microprocessor with an operating system functioning independently from a host.

16. The method of claim 15, further including the step of connecting the EENIC to a network and ignoring all incoming communications or probing until a specifically crafted activation packet is received.

17. The method of claim 15, wherein the FPGA-based operating system responds to the specialized activation packet by establishing a cryptographically secured wormhole communication using a key stored on a system or a subsystem of the EENIC.

* * * * *